United States Patent [19]

Bollini

[11] Patent Number: 5,340,389
[45] Date of Patent: Aug. 23, 1994

[54] WATER BASED MULTICOLOR COATING COMPOSITIONS AND PROCESS FOR THEIR PREPARATION

[75] Inventor: Germano Bollini, San Marino, San Marino

[73] Assignee: Brymore Enterprises S.A., San Marino

[21] Appl. No.: 80,082

[22] Filed: Jun. 18, 1993

[51] Int. Cl.$^5$ .......................... C08L 1/00; C08L 5/00
[52] U.S. Cl. .................. 106/197.2; 106/169; 106/178; 106/197.1; 106/203; 106/204; 106/208; 106/209; 106/217; 524/27; 524/35; 524/45; 524/55; 524/56; 524/58; 525/54.2; 525/54.21; 525/54.3
[58] Field of Search ...................... 106/163.1, 169, 203, 106/204, 197.1, 197.2, 208, 209, 217, 178; 524/27, 35, 45, 55, 56, 58; 525/54.2, 54.21, 54.3

[56] References Cited

U.S. PATENT DOCUMENTS

| | | | |
|---|---|---|---|
| 3,458,328 | 7/1969 | Zola | 106/158 |
| 3,573,237 | 3/1971 | Zola | 106/170 |
| 3,725,089 | 4/1973 | Zola | 106/170 |
| 3,852,076 | 12/1974 | Grasko | 106/170 |
| 4,010,038 | 3/1977 | Iwasaki et al. | 106/158 |
| 4,376,654 | 3/1983 | Zola | 106/170 |
| 5,123,963 | 6/1992 | Rossetti | 106/163.1 |
| 5,125,972 | 6/1992 | Rossetti | 106/163.1 |

FOREIGN PATENT DOCUMENTS 0424594  5/1991  European Pat. Off. .

Primary Examiner—Anthony Green
Attorney, Agent, or Firm—Lerner, David, Littenberg, Krumholz & Mentlik

[57] ABSTRACT

The invention provides aqueous multicolor compositions containing discrete hydrated colored globules dispersed in an aqueous dispersing medium containing a film forming material. To impart the enhanced properties of long term stability and resistance to application by means of brush and roller, the globules are obtained by reacting two or more pigment containing hydrophilic colloids selected from carboxylated cellulose colloids, polysaccharide gums and acrylic polymers with at least two metal cations selected from $Fe^{3+}$, $Al^{3+}$, $Ca^{2+}$, and $Mg^{2+}$. The thus obtained colored globules contain from 2.5 to 20.0% by weight of pigment and fillers and 10 to 40% by weight of a film forming resin. The globules constitute and are about 60 to 90% by weight of the final composition, while the dispersing medium is 40 to 10% by weight of the final composition. The resistance of the globules to application by brush or roller is further enhanced if the film forming material in the dispersing medium has an average particle size within 4 to 200 microns.

27 Claims, No Drawings

WATER BASED MULTICOLOR COATING COMPOSITIONS AND PROCESS FOR THEIR PREPARATION

BACKGROUND OF THE INVENTION

1. Field of the invention

The present invention relates to water based multicolor paints consisting of a dispersion of aqueous colored globules in aqueous dispersing medium.

2. Description of prior art

Multicolor paints consisting of water based dispersions of colored globules in a dispersing medium containing film forming material were first disclosed in U.S. Pat. No. 3,458,328. According to this patent, pigment containing hydrophilic colloids are reacted with insolubilizing medium to obtain colored hydrated gel-like precipitates that are non soluble in surrounding dispersion medium. The insolubilizing agent contained in the insolubilizing medium is of non-colloidal nature such as, e.g., Ca or Al cations, borates etc.

The thus obtained reaction products, i.e. the colored gels, have inherent limitations in membrane strength that make them unsuitable for application with brush or roller and that bring to stability problems of the precipitates if the water content of the composition exceeds critical values.

European Patent appln. No. 89830468.8 discloses a coating composition as obtained according to above cited U.S. Pat. No. 3,458,328, modified in that the film forming materials are resins having average particle size exceeding 2 μm. While these compositions are suitable for application by brush or roller, they still have inherent drawbacks of long term stability at high dilution rates. U.S. Pat. No. 4,376,654 discloses a process for preparing multicolor aqueous paints wherein required colored gel precipitates are obtained by reacting two colloids that are also ionic and opposite in charge. This method has the drawback of being much more expensive than previous ones, where metal cations were used. Moreover, it is more difficult to control correct insolubilization with colloidal solutions than with metal salts solutions, the latter reactants concentration being more easily detected.

U.S. Pat. Nos. 5,123,963 and 5,125,972 disclose a preparation for multicolor aqueous coating compositions providing reactions between colored colloids and Al cations wherein, in order to obtain the required stability and resistance for brush application, the amount of reactant is such as to obtain hard and substantially non-hydrated colored precipitates, suitable to maintain the shape obtained after extrusion of the colored colloids in the insolubilizing medium.

While these products have a good stability at high dilution rates, they are not suitable for brush application because of their skidding on smooth surfaces. Moreover, the obtained precipitates, being dehydrated, have hard consistency, in order to substantially retain their original shapes (e.g. drop, star and so on) and their ratio with respect to dispersing medium is particularly low. Because of these limitations, the colored globules of these coating compositions do not provide a continuous multicolor coating film on the substrate, as provided by other state-of-the-art paints.

OBJECTS OF THE INVENTION

It is an object of the present invention to overcome prior art limitations by a inexpensive process for the preparation of multicolor aqueous coating compositions, containing discrete and hydrated colored globules obtained from the reaction of colloids and insolubilizing agents.

It is a further object of the invention to provide multicolor coating compositions that are suitable for application by brush and roller as well as by spray gun.

It is another object of the application to provide multicolor water based paints having enhanced stability independently of the amount of water contained within the dispersing medium.

BRIEF SUMMARY OF THE INVENTION

The above listed objects are achieved by the present invention that provides multicolor aqueous dispersions wherein colored precipitated globules are hydrated and result from reaction of two or more hydrophilic anionic colloids with two or more metal polyvalent cations.

Preferred anionic colloids are carboxylated cellulose anionic colloids such as carboxymethylcellulose sodium salt (CMCNa), xanthan gums such as KELZAN (trade mark of Kelco Co., San Diego, Calif.) and acrylic polymers e.g. copolymers of acrylic esters and acrylic acids such as REPOLEM polymers (trade mark of R & P ITALIA srl, Viadana (MN), Italy).

Preferred metal cations are cations of alkaline-earth metals and of groups VIIIA, IIA and IIIA, and namely $Fe^{3+}$, $Al^{3+}$, $Ca^{2+}$, $Mg^{2+}$. Most preferred cations are $Fe^{3+}$ and $Al^{3+}$.

The improvement of membrane strength obtained by the present invention is such that the amount of filler within the colored globules is usually of about 3–10% w/w, and may reach 20% w/w, resulting in more solid particles with fuller texturizing and greater covering power and ability to be applied by brush or roller.

Outstanding results of globules resistance in brush-roller application are obtained if the film forming material surrounding the colored precipitated globule of the invention has an average particle size within the range from 4 to 65 μm. Most preferably, such film forming particles are obtained by insolubilization of a standard film forming emulsion by means of the same reactants that were disclosed with reference to preparation of colored globules.

DETAILED DESCRIPTION OF THE INVENTION

As above mentioned, the paints according to the present invention comprise a dispersion of aqueous colored globules in an aqueous dispersing medium. Pigments giving the required color are trapped within the globules and film forming material is provided in the dispersing medium.

According to the invention, colored globules are obtained from the reaction of a base medium containing at least two anionic hydrophilic colloids with a reactive medium containing at least two metal cations selected from $Fe^{3+}$, $Al^{3+}$, $Ca^{2+}$, and $Mg^{2+}$. The amount of metal cations to be used is such as to provide hydrated globules rather than hard precipitates, in a way similar to what disclosed in above cited U.S. Pat. No. 3,458,328 in the name of Zola, herein enclosed by reference.

When the base medium is prepared, two or more hydrophilic colloids selected from carboxylated cellulose colloids, xanthan gums and acrylic polymers in the form of an aqueous solution or emulsion are mixed with pigments and/or fillers and with a film forming resin. In a preferred embodiment, the hydrophilic colloids are a carboxylated cellulose colloid, a xanthan gum, and a copolymer of acrylic esters and acrylic acids, in a weight ratio of 1:1:1. The amount of film forming resins is usually about 8% to 40% by weight of the base medium. The amount of pigments and optional fillers, such as mica, may be as low as about 2.5% by weight, but is preferably higher, in order to obtain greater covering power, fuller texturizing and greater solidity of precipitated globules, e.g. when applied by brush or roller. Usual amount of pigments/fillers in base medium is 3–10% by weight but it can reach 20% w/w without any problem. It is a peculiar advantage of present invention that globule stability is excellent also with such high content of pigment/fillers and that no release of said inerts occurs, even after more than 1,5 years stability tests and after high dilution rates.

The reactive medium is prepared by forming a solution of two or more of above cited metal cations; according to a preferred embodiment, the metal cations are $Fe^{3+}$ and $Al^{3+}$ in a ratio Al/Fe within the range from 0.6:1.0 to 1.4:1.0. To this solution up to 1.3 parts by weight of a cellulose, non-ionic thickener may be added to control its theology.

As discussed above, the amount of reactive medium to be reacted with base medium is such as to avoid dehydration of precipitates and to obtain flowable to geliform hydrated precipitates that are subjected to stirring until the required dimensions of colored globules are obtained.

It is stressed that with "globules" it is here meant a subdivided reaction product having not only substantially roundish shape but also other random shapes, especially when the globules have flowable consistency.

The amount of reactive medium used with respect to base medium is such as to obtain a ratio of colored globules, i.e. of dispersed product, with respect to dispersing medium containing film forming material within the range of from 60:40 to 90:10 and preferably 70:30 to 80:20 in percent by weight.

The thus obtained reaction mixture is thereafter neutralized by addition of known basic compounds such as NaOH, CaOH, aqueous ammonia, calcium carbonate or similar bases. The kind of base used is not critical and it is used in amount sufficient to bring the reaction mixture pH to a value within the range from 4.5 to 7.0, and preferably within 5.5 to 6.5. Neutralization is not necessary for the present invention composition stability, and is actually performed to avoid corrosion problems if the paint is stored in metal containers, and to facilitate addition of basic film forming resins to said mixture.

Once the reaction mixture pH has been brought to the selected value, film forming resins are added together with usual paint additives such as antifoaming agents, calcium carbonate and other fillers, thickeners and the like. Preferred thickeners are polyurethanic thickeners of the so called anti-spattering type, that enhance composition applicability by brush or roller.

Other additives, e.g. dispersing agents, mildew inhibitors etc. are usually added to the base medium.

Preferred film forming resins are acrylic resins, but also other known, commercially available film formers such as styrene-acrylic resins, vinylversatic resins, vinylmaleate resins, vinyl resins, as aqueous emulsions.

The outstanding membrane properties of the globules obtained according to the invention result in surprising long term stability of the relevant coating composition and in the possibility to apply it by brush and roller. The latter advantageous property is further enhanced if the film forming material provided within the dispersing medium has average particle size within the range from 4 to 200 μm, and preferably from 8 to 65 μm.

According to a preferred embodiment, the film forming material having such dimensions is obtained by insolubilization of a commercially available film former aqueous emulsion, with sub-micron average particle dimensions, with colloids and cations according to the above disclosed process to obtain globules. In other words, the required film forming material is obtained by mixing a film forming resin with two anionic hydrophilic colloids selected from carboxylated cellulose colloids, polysaccarides gums and acrylic polymers such as copolymers of acrylic esters and acrylic acids; by reacting the obtained mixture with two or more metal cations selected from $Fe^{3+}$, $Al^{3+}$, $Ca^{2+}$, and $Mg^{2+}$ and by subdividing the thus obtained product until the film forming product has average particles within required size range. Most preferably, the colloids used to obtain the required dimensions of film forming material are the same used in precipitating colored globules. The amount of low dimension resin to be insolubilized is at least 50% w/w of the base medium containing the colloids.

According to a preferred process, the film forming material in the dispersing medium is substantially transparent and multicolor paints are obtained by separately producing monocolor paints, i.e. dispersions of globules having only one color, and subsequently mixing two or more monocolor paints to obtain the required multicolor composition actually sold to end users.

It is also possible to prepare two or more differently colored base mediums and to add them to the reactive medium, or vice versa, in order to obtain the required multicolor paints. Both these processes are disclosed in above cited U.S. patent in the name of Zola.

The invention will now be further disclosed by reference to following non-limiting examples.

EXAMPLE I

| Preparation of the coating product | |
|---|---|
| Solution A (base medium) | |
| Water | q.s. to 100 |
| Sodium Carboxymethylcellulose | 1.65 |
| Xanthan gum | 0.70 |
| Pigment | 2.80 |
| Film-forming resin (50% emulsion) | 20.04 |
| Mildew inhibiting agent | 1.21 |
| Dispersing agent | 1.21 |
| Ethylene glycol | 1.00 |
| Butyl phthalate | 2.00 |
| Antifoaming agent | 0.40 |
| Solution B (insolubilizing agent) | |
| Water | q.s. to 100 |
| Non-ionic cellulose thickener | 0.64 |
| Aluminium sulfate | 8.18 |
| Ferric polychloride | 9.10 |

Obviously, it is possible to vary the percentages of Al and Fe salts, according to the desired degree of insolubilization-precipitation.

Following the process according to the invention,

| Solution B | 10.00 parts |
| Solution A | 70.00 parts | are mixed under stirring.

The product thus obtained is dispersed until the required particle size of discrete aqueous colored globules is obtained.

The following compounds:

| | |
|---|---|
| NaOH 30% solution | 0.20 |
| Antifoaming agent | 0.150 |
| Film-forming resin (thickened with 15% of a 1:1 solution of polyurethane thickener in water) | 16.00 |
| Filler (CaCO$_3$) | 3.55 | are then added to the reaction mixture.

The resulting coating product shows a plurality of colored globules (in this case there is only one color) dispersed in an aqueous dispersion of the transparent film-forming compound. This product is usually mixed with similar, but differently colored, product(s) to obtain the final combination of colors that gives the desired "multipoint" effect.

Example II

The preparation of example I is repeated with the difference that the following colloids are used in the preparation of colored base medium:

| | |
|---|---|
| Sodium Carboxymethylcellulose | 0.80 |
| KELZAN | 0.80 |
| REPOLEM 562 AD | 0.80 |

Moreover, the following amount of mica

| | |
|---|---|
| Mica | 1.12 | is added to the composition, and the following cations are used in the preparation of the insolubilizing medium:

| | |
|---|---|
| Aluminium sulfate | 7.80 |
| Ferric polychloride | 8.30 |
| Calcium Chloride | 1.35 |

EXAMPLE III

Production of particles of film-forming material by insolubilization-precipitation of a film-forming resin. Solution A (film-forming material+colloid)

| | |
|---|---|
| Water | q.s. to 100 |
| Polysaccharide gum | 0.18 |
| Sodium Carboxymethylcellulose | 0.18 |
| Polyacrylic thickener | 0.18 |
| Bentone Paste | 0.67 |
| Dispersing agent | 1.5 |
| Mildew-inhibiting agent | 0.6 |
| Acrylic resin | 54.0 |
| NH$_3$ aq. | 0.16 |

12 parts of this solution are then reacted with 61 parts of solution B. The thus obtained reaction product is stirred until the desired size of particles (4 to 200 μm) is reached.

The following products are then added:

| | |
|---|---|
| NaOH 30% solution | 0.20 |
| Polyurethane thickener (1:1 in water) | 1.65 |
| "anti-spater" cellulose (4% solution) solution) | q.s. to 100 |
| Antifoaming agent | 0.25 |
| Synthetic aragonite | 1.40 |

This film forming material can be used in the preparation of coating composition of the invention instead of commercially available film forming materials to enhance resistance to brush and roller application.

I claim:

1. An aqueous coating composition comprising an aqueous dispersing medium containing at least one first film forming materials and a plurality of hydrated discrete colored globules dispersed within said aqueous dispersing medium, wherein said colored globules are from 60 to 90% by weight of said composition and said dispersing medium is from 40 to 10% by weight of said composition, said globules being the reaction product of a base medium comprising a mixture of at least two hydrophilic anionic colloids selected from the group consisting of carboxylated cellulose colloids, polysaccharide gums and acrylic polymers, and a reactive medium comprising a mixture of at least two metal cations selected from the group consisting of $Fe^{3+}$, $Al^{3+}$, $Ca^{2+}$, and $Mg^{2+}$; said base medium further comprising from 2.5 to 20.0% by weight of at least one pigment, filler, or a mixture thereof, and from 10 to 40% by weight of a second film forming material.

2. A composition according to claim 1, wherein said mixture of hydrophilic colloids is selected from the group consisting of sodium carboxymethylcellulose, xanthan gum and a copolymer of acrylic esters and acrylic acids.

3. A composition according to claim 2, wherein said mixture of metal cations comprises $Fe^{3+}$ and $Al^{3+}$.

4. A composition according to claim 3, wherein said colored globules are from 70 to 80% by weight of said composition and said dispersing medium is from 20% to 30% by weight of said composition.

5. A composition according to claim 1, wherein said second film forming material is an acrylic resin.

6. A composition according to claim 4, wherein said mixture of hydrophilic colloids comprises sodium carboxymethylcellulose, xanthan gum and a copolymer of acrylic esters and acrylic acids in a weight ratio of 1:1:1.

7. A composition according to claim 1, having a pH within the range of from 4.5 to 7.0.

8. A composition according to claim 7, having a pH within the range from 5.5 to 6.5.

9. A composition according to claim 1, wherein said first film forming material in said dispersing medium is in particulate form and has an average particle size within a range of from 4 to 200 μm.

10. A composition according to claim 9, wherein said average particle size is within the range from 8 to 65 μm.

11. A composition according to claim 9, wherein said first film forming material comprises a first film forming resin, and said second film forming material comprises a second film forming resin, said first film forming resin may be the same or different from said second film forming resin, said mixture of hydrophilic colloids comprises a first mixture of hydrophilic colloids and said mixture of metal cations comprises a first mixture of metal cations, and said first film forming resin is insolubilized within the reaction product of a second mixture of at least two anionic hydrophilic colloids selected from the group consisting of carboxylated cellulose colloids polysaccharide gums and acrylic polymers, and a second mixture of at least two metal cations selected from the group consisting of $Fe^{3+}$, $Al^{3+}$, $Ca^{2+}$, and $Mg^{2+}$.

12. A composition according to claim 11, wherein said second mixture of hydrophilic colloids is sodium carboxymethylcellulose, xanthan gum and a copolymer of acrylic esters and acrylic acids in a weight ratio of 1:1:1, and said second mixture of metal cations is $Al^{3+}$ and $Fe^{3+}$.

13. A composition according to claim 12, wherein at least one of said first and second film forming resins is an acrylic resin.

14. A composition according to claim 12, wherein at least one of said first and second film forming resins is a styrene-acrylic resin.

15. A composition according to claim 1, comprising differently colored globules.

16. A composition according to claim 11, wherein said particulate film forming material is substantially transparent.

17. A process for preparing an aqueous coating composition having a plurality of hydrated colored globules dispersed within an aqueous dispersing medium containing a first film forming material, comprising the steps of:
  preparing an aqueous base medium comprising a mixture of at least two anionic hydrophilic colloids selected from the group consisting of carboxylated cellulose colloids, polysaccharide gums and acrylic polymers, from 2.5 to 20.0% by weight of at least one pigment, filler, or a mixture thereof, and from 10 to 40% by weight of a second film forming material;
  preparing a reactive medium comprising a mixture of at least two metal cations selected from the group consisting of $Fe^{3+}$, $Al^{3+}$, $Ca^{2+}$, and $Mg^{2+}$;
  reacting said base medium with said reactive medium;
  subdividing said reaction product to obtain an aqueous dispersion of a plurality of hydrated, colored and discrete globules visible to the naked eye; and
  adding to the thus obtained aqueous dispersion said first film forming material, and wherein said globules are present in said aqueous dispersion medium in an amount of from 60 to 90% by weight of said dispersion.

18. A process according to claim 17, wherein said mixture of at least two colloids is selected from the group consisting of sodium carboxymethylcellulose, xanthan gum, and copolymers of acrylic esters and acrylic acids.

19. A process according to claim 18, wherein said mixture of metal cations comprise $Fe^{3+}$ and $Al^{3+}$.

20. A process according to claim 19, wherein said mixture of hydrophilic colloids is sodium carboxymethylcellulose, xanthan gum and a copolymer of acrylic esters and acrylic acids, said colloids being present in said base medium in a weight ratio of 1:1:1.

21. A process according to claim 17, wherein said first and second film forming materials comprise film forming resins, and wherein at least one of said first and second film-forming resins is an acrylic resin.

22. A process according to claim 17, wherein said globules are present in said aqueous dispersing medium in an amount of from 70 to 80% by weight.

23. A process according to claim 17, further comprising the step of bringing the pH of said subdivided reaction product to a value within the range of from 4.5 to 7.0 prior to said step of adding said first film forming material.

24. A process according to claim 17, wherein said first film forming material is in particulate form and has an average particle size within the range of from 4 to 200 $\mu$m.

25. A process according to claim 24, wherein said first and second film forming materials comprise first and second film forming resins, said mixture of hydrophilic colloids comprises a first mixture of hydrophilic colloids and said mixture of metal cations comprises a first mixture of metal cations, said film forming particles are obtained by the steps of mixing said first film forming resin with a second mixture of two anionic hydrophilic colloids selected from the group consisting of carboxylated cellulose colloids, polysaccharide gums and acrylic polymers; reacting the obtained mixture with a second mixture of two or more metal cations selected from the group consisting of $Fe^{3+}$, $Al^{3+}$, $Ca^{2+}$, and $Mg^{2+}$, and subdividing the thus obtained product until said film forming material has an average particle size within said range.

26. A process according to claim 24, wherein said particle size range is of from 8 to 65 $\mu$m.

27. A process according to claim 17, further comprising the steps of:
  repeating said step of preparing said aqueous dispersion of a plurality of colored globules at least once to produce a first aqueous dispersion and at least a second aqueous dispersion, provided that each of the thus-produced aqueous dispersions is differently colored from each other, and
  mixing said first and second aqueous dispersions together to produce a multi-colored coating composition.

* * * * *

UNITED STATES PATENT AND TRADEMARK OFFICE
CERTIFICATE OF CORRECTION

PATENT NO. : 5,340,389
DATED : August 23, 1994
INVENTOR(S) : Bollini

It is certified that error appears in the above-indentified patent and that said Letters Patent is hereby corrected as shown below:

In [57] Abstract, line 14, delete "and are".

Column 2, line 37, "globules" should read --globule--.

Column 2, line 39, "globule" should read --globules--.

Column 3, line 24, "theology" should read --rheology--

Signed and Sealed this

Twenty-ninth Day of November, 1994

Attest:

BRUCE LEHMAN

*Attesting Officer*  *Commissioner of Patents and Trademarks*